United States Patent [19]

Kidokoro et al.

[11] Patent Number: 4,605,463

[45] Date of Patent: Aug. 12, 1986

[54] PROCESS OF FORMING ORNAMENTAL JOINTS

[75] Inventors: Susumu Kidokoro; Eiichi Tajima, both of Tokyo, Japan

[73] Assignee: Tajima Oyo Kako Kabushiki Kaisha, Chiyoda, Japan

[21] Appl. No.: 658,596

[22] Filed: Oct. 9, 1984

[30] Foreign Application Priority Data

Nov. 7, 1983 [JP] Japan ................................ 58-208568

[51] Int. Cl.[4] ................................................ B32B 31/18

[52] U.S. Cl. ..................................... 156/247; 156/248; 156/250; 156/267; 156/268

[58] Field of Search ............... 156/250, 267, 268, 247, 156/344, 523, 574, 248; 428/44, 46, 47, 48; 83/864, 869, 875, 879, 880

[56] References Cited

U.S. PATENT DOCUMENTS 1,897,458 2/1933 Whitney .............................. 156/268
2,744,564 5/1956 Woodburn .......................... 156/268
2,808,358 10/1957 Masse ................................. 156/248
4,054,165 10/1977 Karakawa ............................ 83/875

FOREIGN PATENT DOCUMENTS 0009732 1/1985 Japan .................................. 156/267

*Primary Examiner*—Caleb Weston
*Attorney, Agent, or Firm*—Felfe & Lynch

[57] ABSTRACT

This process of forming ornamental joints comprises sticking a sheet flooring material onto a floor base, thereafter drawing one desirably outlined standard line on the thus stuck sheet flooring material, then sliding one cutting blade of a cutter with a pair of cutting blades, disposed leaving a space corresponding to the joint width therebetween, on the sheet flooring material along the standard line to thereby form two parallel cuts on the flooring material, stripping the sheet flooring material between these cuts to thereby form a groove for forming a joint, and charging the grooved portion with a joint material. According to the process like this, there can be obtained ornamental joints of various patterns.

2 Claims, 24 Drawing Figures

PROCESS OF FORMING ORNAMENTAL JOINTS

BACKGROUND OF THE INVENTION

This invention relates to a process of forming ornamental joints on a sheet flooring material stuck to a floor base and cutters used therefor.

Part of the floor surface with the hitherto known ornamental joints is shown in FIG. 1, wherein reference numeral 1 denotes a flooring material comprising square tiles (regular square tiles in the drawing) and ornamental joints 2 are formed between these flooring materials.

The processes of forming aforesaid joints 2 are partly shown in FIG. 2A, FIG. 2B and FIG. 2C.

Explanation will be made thereon.

In these figures, reference numeral 3 denotes a floor base. On the surface of said floor base there are depicted standard lines 4 and 5 for use in laminating the flooring material, said standard lines comprising vertical and horizontal lines which form plural square sections 6, said square section having a width whose length is the total of the width L of the flooring material 1 and the width L' of the joint 2, and then a perspective adhesive 7 is applied on the surface of the standard lines.

In succession, the flooring material 1 is put on the surface of the adhesive 7 as well as the upper portion of the perspective section 6 so that two crossing sides 8 and 9 of the flooring material 1 may coincide with standard lines 4 and 5 respectively, and is stuck. Next, spacers 12 and 13 having the width L' are disposed in a space on the surface of the adhesive 7 formed between the other two crossing sides of the thus stuck flooring material 1 and the standard lines 4 and 5 (FIG. 2A and 2B).

Thereafter, the same procedure as this is repeated successively, and before the spacers 12 and 13 are fixed by the adhesive, the spacers 12 and 13 are stripped off to thereby form a groove for forming a joint between the respective flooring materials 1. Then, masking tapes 15 are arranged along both edge sides of this material 1 so as to adhere to the surface of the flooring material 1, the grooved portion is charged with a joint material 14 (FIG. 2C), and thereafter the masking tape 15 is stripped, thereby obtaining a floor surface as shown in FIG. 1.

By providing the ornamental joint 2 like this, there is caused possibility of finishing the floor surface in the mode of marble or brick and obtaining the floor surface with an utterly different sense even when the same flooring material is used. Therefore, the provision of ornamental joints is advantageous in achieving extremely superior design effects.

However, the conventional process of forming the above mentioned floor surfaces include various drawbacks as shown below:

(1) Since the flooring material 1 used therein is a square tile whose vertical and horizontal dimensions are uniform, the ornamental joint patterns are limited to specific ones and it is difficult to form complicated joint patterns. In other words, when intending to change ornamental joint patterns by changing the vertical and horizontal dimensions inherent in the flooring materials used, it is necessary to cut off or add part of the flooring materials. Due to this, the operation becomes complicated and takes a long time, further the external appearance of the flooring materials is spoiled because in addition to the ornamental joint there is formed an unnecessary joint at the added portion, (2) Next, as the conventional process necessitates spacers 12 and 13 as described above, spacers must be prepared for which have various dimensions well-fitting to the length and width of each ornamental joint. Therefore, it is not only expensive but also complicates the operation including selection-working of spacers and the like. Still further, since the adhesive attaches to the spacers when removed, it is necessary to remove the adhesive therefrom, and in addition since there is the possibility of this attached adhesive staining the flooring materials, it is necessary to pay close attention in order to prevent the occurrence of such trouble, and (3) Lastly, this process uses fixed-formed and independently separated flooring materials, and so is unable to use a sheet flooring material which is indefinite-formed and independently non-separated.

SUMMARY OF THE INVENTION

Accordingly, it is an object of this invention to provide a process of forming ornamental joints which is capable of eliminating the above mentioned drawbacks inherent in the conventional process of forming ornamental joints, forming ornamental joints whose patterns are not limited to specific ones, dispensing with the complicated operations such as choice and use of spacers as seen in the conventional process and producing ornamental joints with complicated patterns easily and cheaply.

According to this invention, said object can be achieved by sticking a sheet flooring material onto a floor base, thereafter drawing one desirably outlined standard line on said sheet flooring material, then sliding one cutting edge of a cutter with a pair of cutting edges disposed leaving a space corresponding to the joint width therebetween on the sheet flooring material along said standard line to thereby form two parallel cuts on said flooring material, stripping the sheet flooring material between these cuts to thereby form a groove for forming a joint, and charging said grooved portion with a joint material. That is, as the flooring material used is a sheet flooring material, the pattern of the ornamental joint can be made refined without being limited to the specific patterns by virtue of selecting the standard lines drawn on the sheet flooring material, and furthermore for that purpose there are no such disadvantages as seen in the conventional process, namely, that there is the necessity of using a perspective adhesive through which can be seen the standard lines drawn on the floor base, there is the necessity of using spacers provided temporarily between the respective flooring materials and the like. The cuts used for forming a groove for forming a joint can be formed at a stroke by the movement of the cutter, and the width of the cut can be changed readily by previously adjusting the space between a pair of cutting edges to a desired space.

It is another object of this invention to provide a process of forming ornamental joints which is capable of providing a masking more easily and accurately than usual on a flooring material along both side edges of said stuck sheet flooring material when charging a groove for forming a joint with a joint material.

According to this invention, said object can be achieved by providing one embodiment of this invention which comprises sticking a tape like material covering the surface of standard lines drawn on a sheet flooring material, said tape like material being transparent and wider than the width of a groove for forming a joint; forming cuts on said tape like material and the sheet flooring material by sliding a cutter on the tape like material which making one cutting edge go along said standard line which can be seen through this tape like material or sticking a tape like material, which has standard lines printed thereon and is wider than the width of the groove for forming a joint, on the sheet flooring material stuck to a floor base and sliding a cutter on the tape like material while making one cutting edge go along said standard line; stripping the sheet flooring material between these cuts and the tape like material stuck onto its surface to thereby form a groove for forming a joint, and forming a masking by said tape like material remaining on its both edge sides. That is, this makes it possible to dispense with the 2-stage operation, as seen in the usual masking operation, which includes the operation of forming the groove for forming a joint and the operation of adhering two sheets of band like materials along both edge sides of the thus formed grooved portion, and to provide the band like material with cuts at the same time when providing the cuts for use in the formation of the grooved portion, whereby the masking is formed at a single stroke simultaneously with the formation of the grooved portion.

It is a further object of this invention to provide a grooved joint-forming cutter which is capable of providing cuts for use in the formation of joint-forming grooved portions in a sheet flooring material more easily, efficiently and accurately.

According to this invention, said object can be achieved by providing a cutter which includes a first body and a second body which have mutually opposite side walls and bottom surfaces locating substantially on the same plane and can be connected by a fastening means, a pair of cutting blades and/or more of spacers disposed between these cutting blades and/or between the cutting blades and said both bodies, one of the side walls being provided with a pair of locating pins, the other of the side walls being provided at the place corresponding to said pins with holes for fitting the pins therein. That is, by sliding the cutter on the sheet flooring material in the manner of moving one cutting blade along only one standard line formed on the sheet flooring material, there can be simultaneously formed two cuts which are used for forming a groove for forming a joint. According to this invention, therefore, the standard line-drawing operation is done easily, further the cut-forming operation is carried out easily and efficiently, still further the distance between both cuts is always maintained uniformly and so accurate cuts can be obtained, and additionally the distance between both cuts can be controlled readily by inserting or removing spacers.

It is still a further object of this invention to provide a cutter for cutting grooved joints which is capable of readily regulating the projecting amount of the edge of the cutting blade of the cutter from the body and readily exchanging the broken edges and grinding the abrased edges.

According to this invention, said object can be achieved by providing one embodiment wherein inclined slots are provided symmetrically on the opposite side walls of both bodies, a cutting blade is provided with a hole in which a pin fits, both ends of said pin being designed to slide in said slot, and a spacer is provided with a slot hole having substantially the same shape as that of said slot in which said pin slide-fits and a hole in which a locating pin fits, said locating pin being provided on the side wall of one body, and a further embodiment wherein a first body and a second body are connected with the freedom of opening and shutting by means of a hinge provided in the inside on the bottom surface side and are fastened by engaging a ring provided on one body with a hook provided on the other body. That is, the projecting amount of the edge of the cutting blade may be controlled readily by unfastening the both bodies fastened using a fastening means and making the pin fitted in the hole of the cutting blade slide along the slots of both bodies and the slot hole of the spacer. Further, the increase in the projecting amount can abrase the edge of the cutting blade readily while attaching the cutting blade to the body. Still further, as both bodies can be opened by the hinge, if necessary they may be exchanged easily.

DETAILED DESCRIPTION OF THE INVENTION

Figure 1:
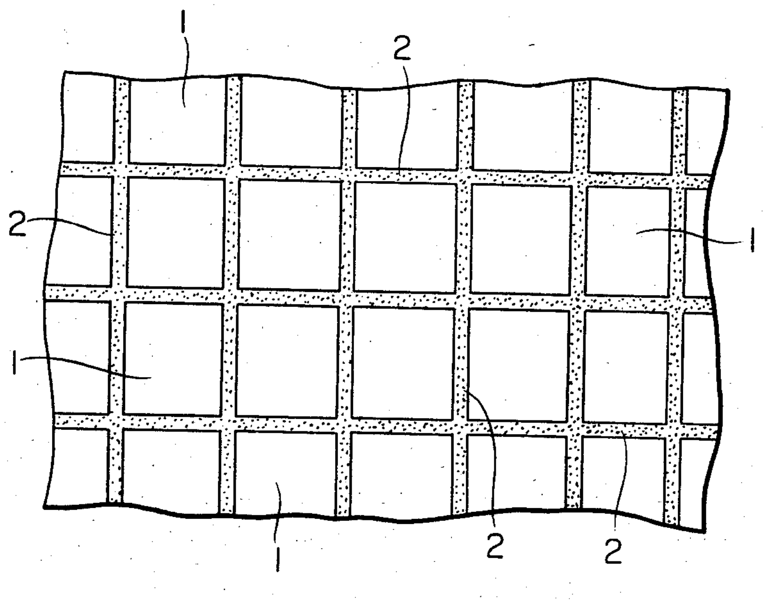
FIG. 1 PRIOR ART
FIG. 1 is a partial plan view of the floor surface formed by the conventional process of forming ornamental joints.
Figure 2A:
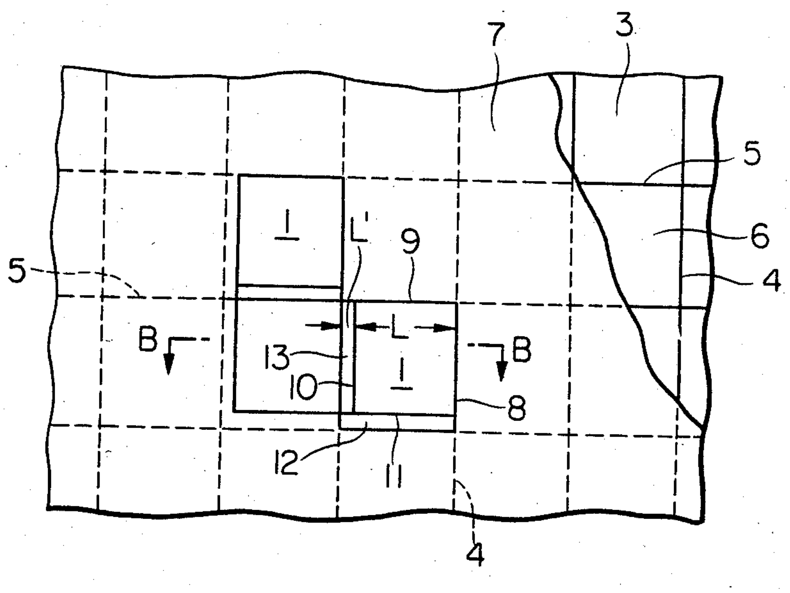
FIG. 2A PRIOR ART
FIG. 2A is a partially cutaway plan view illustrating the outline of the conventional process of forming the floor surface shown in FIG. 1.
Figure 2B:
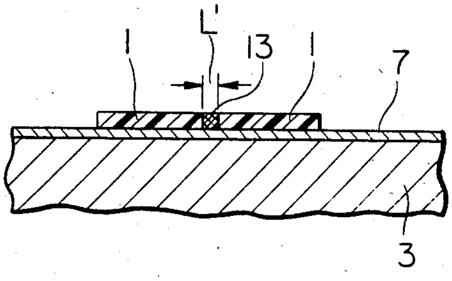
FIG. 2B PRIOR ART
FIG. 2B is a sectional view taken in the direction of arrows along the line B—B of FIG. 2A.
Figure 2C:
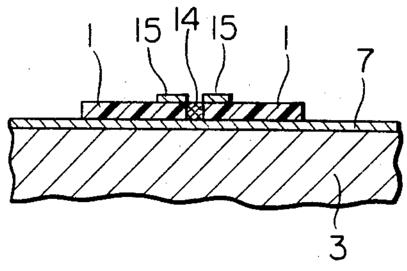
FIG. 2C PRIOR ART
FIG. 2C is a sectional view illustrating the state of having charged the portion of FIG. 2B with a joint material.
Figure 3:
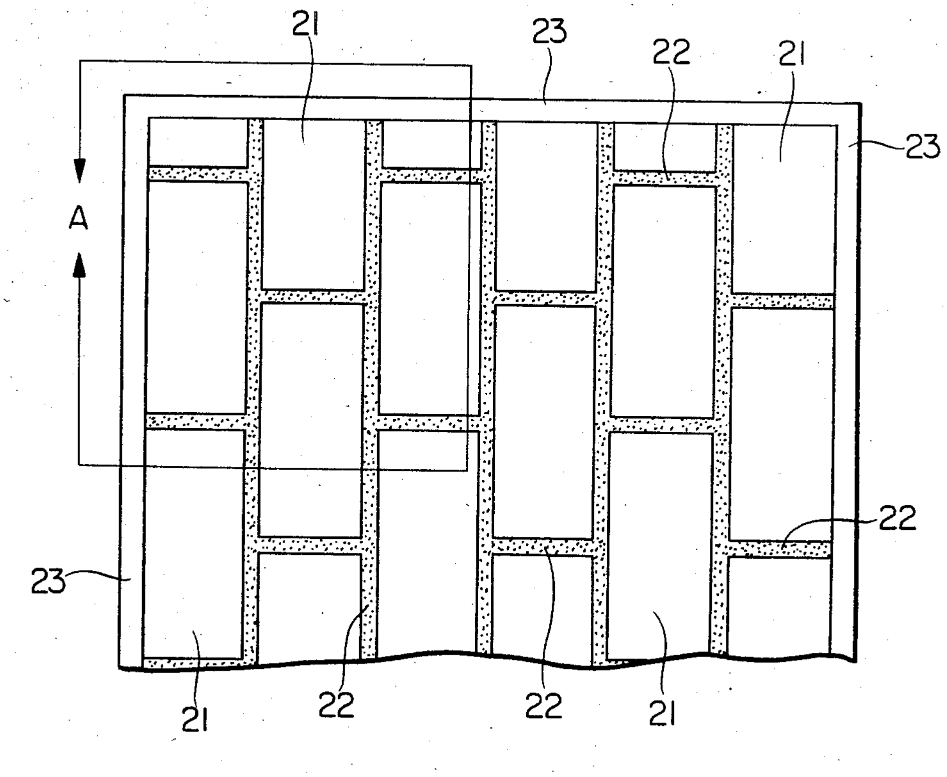
FIG. 3 is plan view illustrating part of the floor surface formed by a process of forming ornamental joints according to this invention.

FIG. 3 partially shows the floor surface with ornamental joints formed using the forming process according to this invention, wherein reference numeral 21 denotes a flooring material adhered onto a floor base 23, and in the middle of these flooring materials 21 there are formed ornamental joints 22.

Next, a process of forming the above mentioned ornamental joints 22 and a cutter used therefor will be explained hereinafter with reference to embodiment shown in the drawings.

Figure 4:
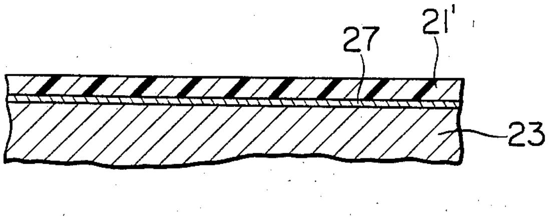
FIG. 4 is a partial sectional view illustrating the state of having stuck a sheet flooring material onto a floor base on forming the floor surface shown in FIG. 3.
Figure 5:
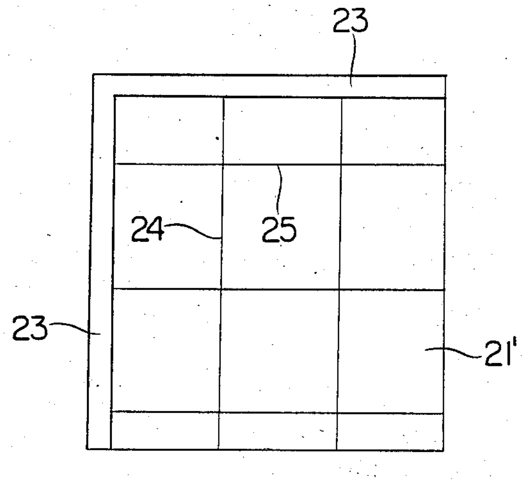
FIG. 5 is a plan view of A portion of FIG. 3 illustrating the state of having drawn standard lines on the surface of the floor shown in FIG. 4.

A sheet floor material 21' is stuck on the floor base 23 through on adhesive 27 (FIG. 4), and on its surface there were depicted desirably outlined crosswise standard lines 24 and 25 by using a suitable drawing means (FIG. 5).

Figure 6:
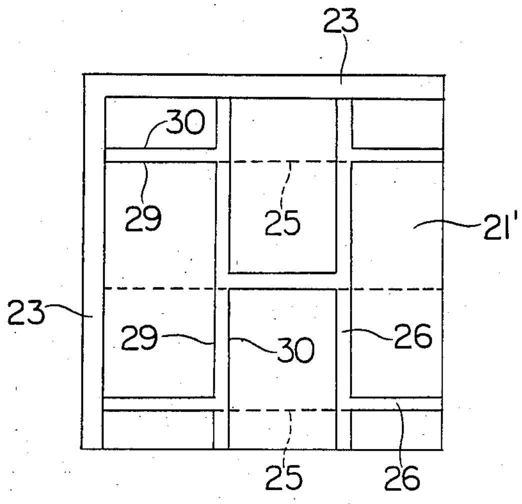
FIG. 6 is a plan view illustrating the state of having formed cuts on the surface shown in FIG. 5 by means of a cutter.
Figure 7A:
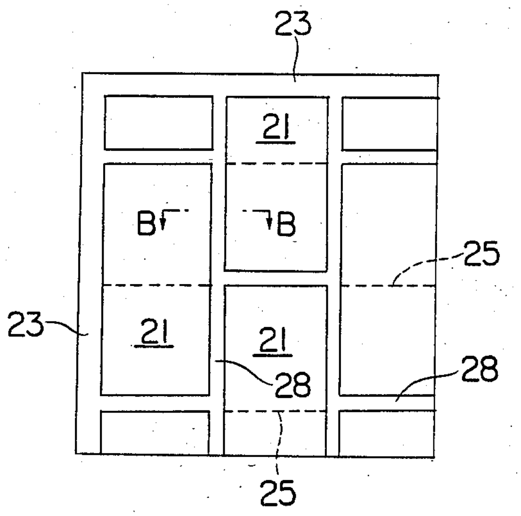
FIG. 7A is a plan view illustrating the state of having stripped the flooring material between cuts on the surface shown in FIG. 6.
Figure 7B:
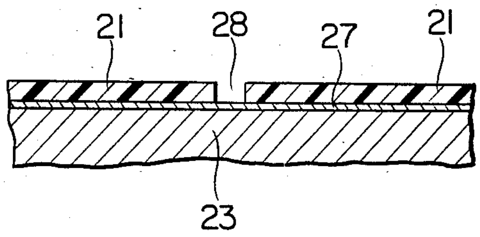
FIG. 7B is an enlarged sectional view taken in the direction of arrows along the line B—B of FIG. 7A.

Then, a groove for forming a joint 28 is formed using a cutter 41 which has a pair of cutting blades 57 and 57' disposed at a distance corresponding to the width of a joint 22 as detailed afterwards. On forming this grooved portion 28, either cutting blade 42 or 43 is moved along the standard lines 24 and 25 thus two parallel cuts 29 and 30 are formed on the sheet floor material 21' (FIG. 6), and thereafter the flooring material 26 between these cuts 29 and 30 is stripped off, thereby obtaining the grooved portion 28 (FIG. 7A and FIG. 7B).

Figure 8:
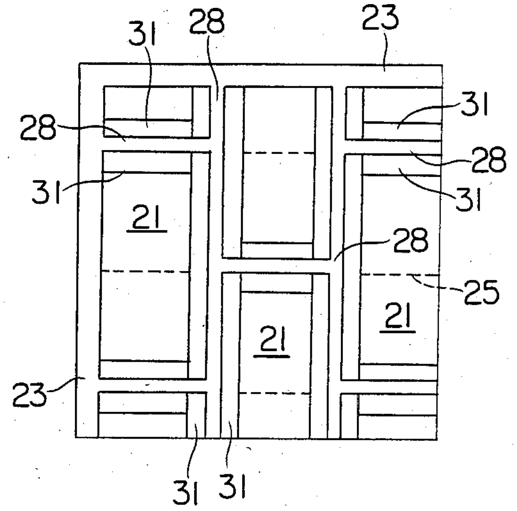
FIG. 8 is a plan view illustrating the state of having applied masking onto the floor surface shown in FIG. 7A.
Figure 9A:
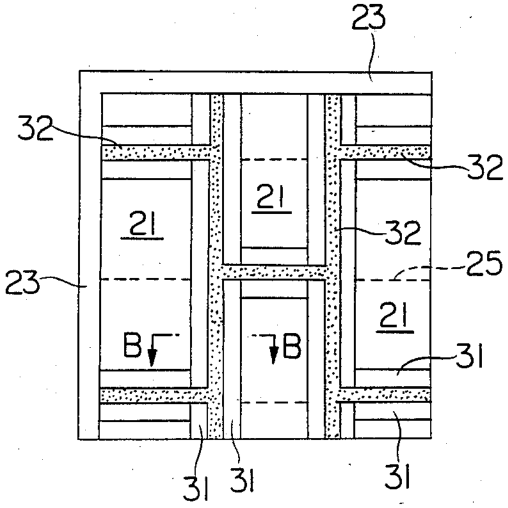
FIG. 9A is a plan view illustrating the state of having charged the floor surface shown in FIG. 8 with a joint material.
Figure 9B:
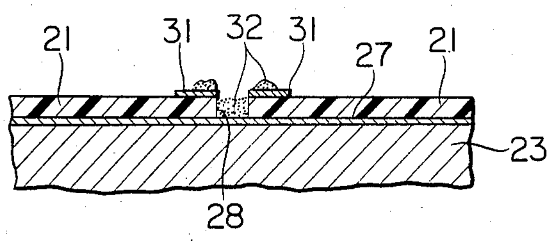
FIG. 9B is an enlarged sectional view cutaway along the line B—B and taken in the direction of arrows in FIG. 9A.

And, this grooved portion 28 is charged with a joint material. In the practice of this charging, it is preferable that a tape like masking 31 is adhered along the side edges of the grooved portion 28 as shown in FIG. 8, a joint material 32 is filled in the groove 28 from between this masking 31 (FIG. 9A and FIG. 9B), and thereafter the masking 31 is stripped to thereby obtain a floor surface as shown in FIG. 3.

In the above mentioned case, it is possible to optionally select the pattern for the ornamental joint, but in many cases there are normally employed the marble-tone pattern and the brick-tone pattern. Its width is normally in the range of several mm-ten-add mm, although the width differs depending on the pattern to be employed.

The purpose of providing a masking 31 is exactly same as the purpose of the usual process. The masking 31 may be provided at any time, for instance, such as prior to the formation of the grooved portion 28, at the same time with the formation thereof or after the formation thereof.

In order to provide the grooved portion 28 efficiently as well as accurately, however, it is preferable that it is provided simultaneously with the formation of the grooved portion 28. For that purpose, one embodiment of this invention is designed so that a tape like material is stuck onto the surface of standard lines 24 and 25 drawn on a sheet flooring material 21', said tape like material being perspective and wider than the width of the grooved portion 28, one cutting blade 57 or 57' of a cutter 41 is slided on the surface of this tape like material along the perspective standard lines 24 and 25 to thereby form cuts, and then the sheet flooring material between cuts and the tape like material stuck onto the surface of the sheet flooring material are stripped off to thereby form a grooved portion 28 provided at its side edge with a masking 31.

Figure 10:
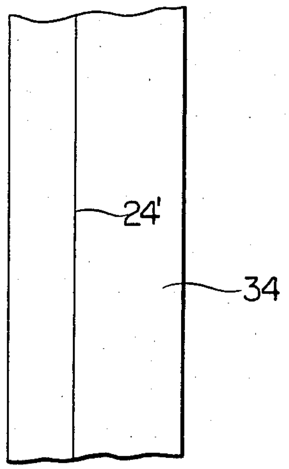
FIG. 10 is a plan view illustrating one example of a masking-forming tape like material used in the process of forming joints according to this invention.

In this invention, furthermore, the formation of the grooved portion is carried out by stucking a tape like material wider than the non-illustrated grooved portion 28 on the portion where a cut is formed, in place of drawing standard lines on the sheet flooring material 21', drawing a standard line on the surface of said tape like material, operating a cutter along this standard line in the exactly same manner as aforesaid to thereby form a grooved portion; or said grooved portion is also formed by using a tape like material 34 which has printed a standard line 24' on its surface and is wider than the width of the grooved portion 28 as shown in FIG. 10, in place of the above mentioned tape like material and sticking the latter tape like material on the sheet flooring material 21', and repeating the exactly same operation as employed in the former case. In the latter case, there is no necessity of limiting the tape like material to the transparent one as mentioned above, and further when the latter tape like material 34 is used, the formation and change of ornamental patterns can be more facilitated.

FIG. 11–FIG. 18 show Examples of cutters for use in the process of forming grooved joints according to this invention.

This cutter 41 comprises a first body 42 with a bottom surface 44 and a second body 43 with a bottom surface 45, said bottom surfaces being substantially the same-shaped and located on the same plane, said bodies being disposed at regular intervals S therebetween and connected with the freedom of opening and shutting respectively by hinges 46 and 47 attached to the inside on the bottom surface side, a fastening means 50 which is disposed on the top surface and is consisted of a ring 48 and a hook 49, and a pair of cutting blades 57 and 57' and a suitable number of spacers 58 to be put between the bodies 42 and 43 when this fastening means 50 is fastened.

Figure 13:
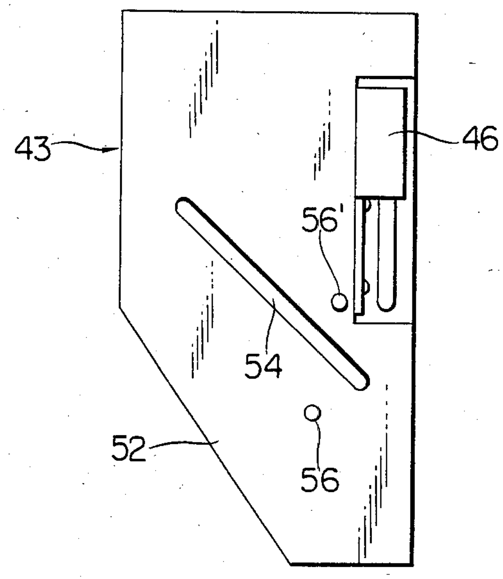
FIG. 13 is a plan view illustrating the inside surface of a second body of the cutter shown in FIG. 11.
Figure 14:
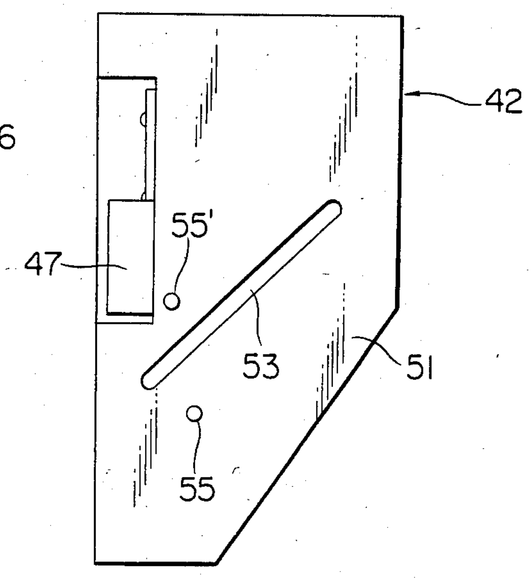
FIG. 14 is a plan view illustrating the inside surface of a first body of the cutter shown in FIG. 11.

The both bodies 42 and 43 are provided on their opposite side walls 51 and 52 with grooves 53 and 54 which are inclined symmetrically downwards from the front to the rear. The first body 42 is provided with a pair of pins 55 and 55' putting the groove 53 therebetween, while the second body 43 is provided with blind holes 56 and 56', at the places corresponding to the pins 55 and 55', putting the groove 54 therebetween. These pins are arranged to fit in said blind holes (FIG. 13 and FIG. 14).

Figure 15:
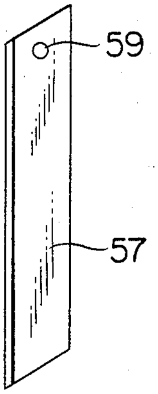
FIG. 15 is a plan view of the cutting blade of the cutter shown in FIG. 11.

FIG. 15 shows a cutting blade 57. Adjacently to the rear end of the narrow body of the cutting blade 57 there is provided a hole 59. This cutting blade 57 is preferable to be flat. The cutting blade for use in the NT cutter is most suitable for this purpose. This is applicable to the remaining cutting blade 57'.

Figure 16:
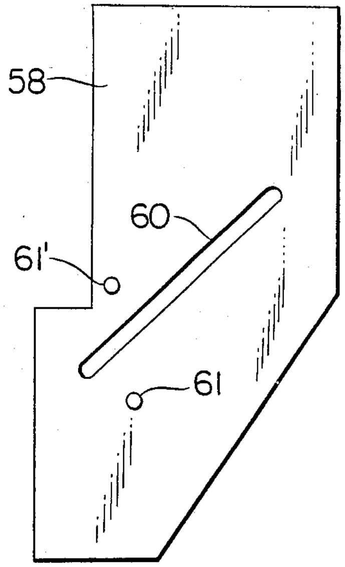
FIG. 16 is a plan view of the spacer of the cutter shown in FIG. 11.

FIG. 16 shows a spacer 58. This spacer comprises a 0.1-several mm-thick plate body and takes the substantially same shape as the side walls 51 and 52 of the bodies 42 and 43. At the places corresponding to the grooves 53 and 54 of the bodies there is provided a slot 60 of the same kind, and at the places corresponding to the pins 55 and 55' there are provided holes 61 and 61'.

Figure 17:
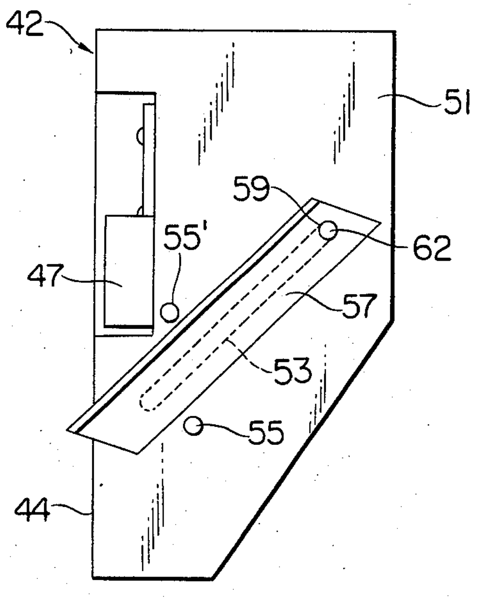
FIG. 17 is a plan view illustrating the state of having attached the cutting blade shown in FIG. 15 to the first body shown in FIG. 14.

FIG. 17 shows the state of having provided the cutting blade 57 to the first body 42. The cutting blade 57 abuts its one surface with the side wall 51 and is carried thereon. The edge of the cutting blade protrudes from the bottom surface, its middle portion is located between the pins 55 and 55', and the pin 62 passed through a hole 59 fits in the groove 53 to thereby attach the cutting blade 57 to the body 42. The cutting blade 57 of this kind controls the projecting amount of the edge of the cutting blade from the bottom surface 44 by sliding the pin 62 inside the groove 53. Said projecting amount is normally established to be in the range of 0.5-several mm.

Figure 18:
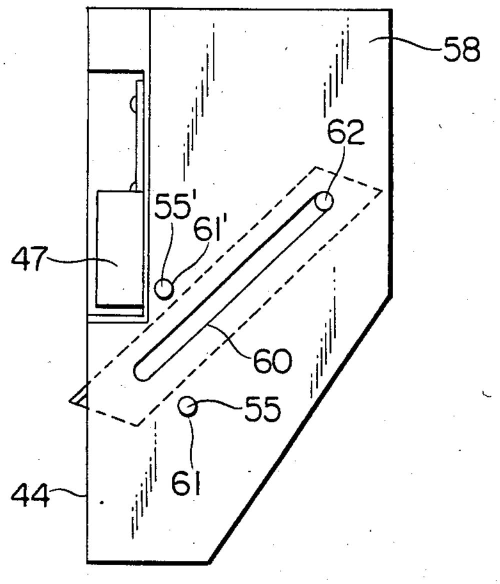
FIG. 18 is a plan view illustrating the state of having attached the spacer shown in FIG. 16 onto the cutting blade shown in FIG. 17.

FIG. 18 shows the state of having carried the spacer 58 on the cutting blade 57, wherein the pin 62 fits in the slot 60, and pins 55 and 55' fit in holes 61 and 61'. Depending on the distance between both cutting blades 57 and 57', a necessary number of spacers 58 are carried on the cutting blade 57, and further thereon is carried the cutting blade 57' in the just same manner as the cutting blade 57. If further necessary, a spacer 58 is carried thereon and then the same is fastened as described above by using the fastening means 50.

In case where the edge of the cutting blade 57 or 57' is damaged or subject to abrasion in the thus constructed cutter 41, the fastening means 50 is released to open both bodies 42 and 43 using hinges 46 and 47, and the pin 62 is slided along the slot 60 so that the edge may protrude from the bottom surface 44 so as to cut off or grind the unnecessary portion of the cutting blade or exchange the cutting blade as a whole. Thus, the reformation is done.

With reference to this example, there may be considered various modifications in addition to the illustrated one. For instance, the fastening means 50 may be provided not at the illustrated position but on both right and left side walls shown in FIG. 11, one to both side walls, respectively. The fastening means used herein may be not the one of this type, but the one like a bolt with a nut penetrating both bodies or the one which comprises providing an anchor bolt to either of bodies, protruding its edge penetrating the other body, and fastening it with a nut.

Figure 11:
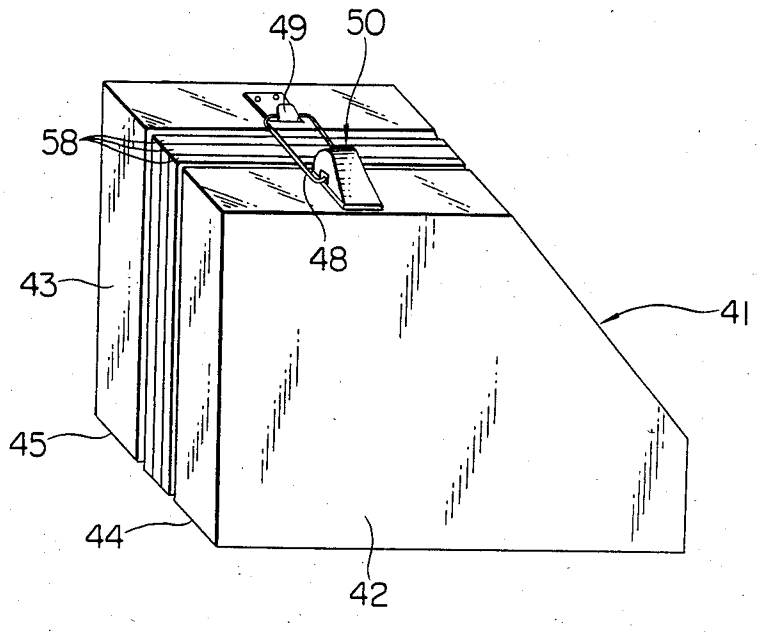
FIG. 11 is a perspective view illustrating the embodiment of the cutter used in the process of forming joints according to this invention.
Figure 12:
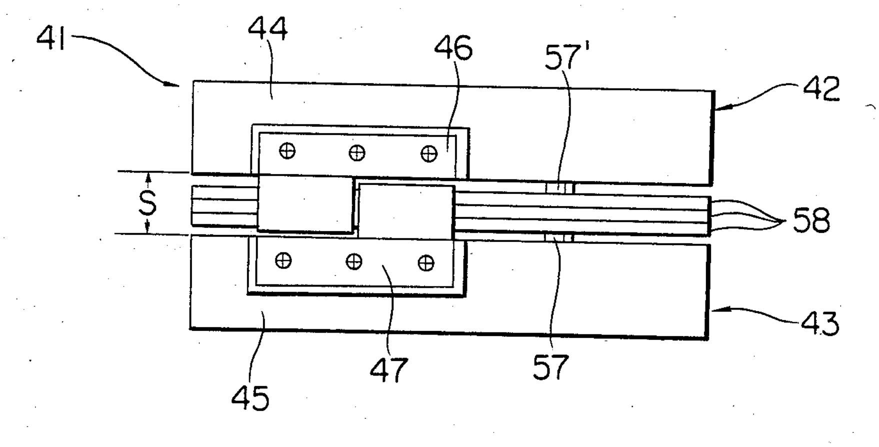
FIG. 12 is a bottom plan view illustrating the cutter shown in FIG. 11.

On using the above mentioned cutter 41, the cut forming operation can be carried out relatively easily by putting the palm on the right-hand inclined surface shown in FIG. 11 and pushing it to the left.

Figure 19A:
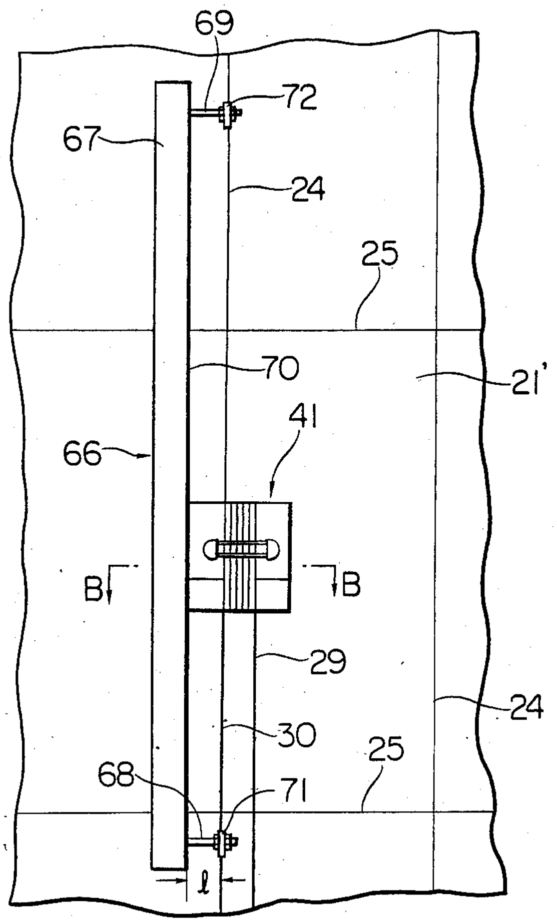
FIG. 19A is a plan view illustrating one example of the operation of forming cuts for use in the joint forming-grooved portion employed when forming joints according to this invention.
Figure 19B:
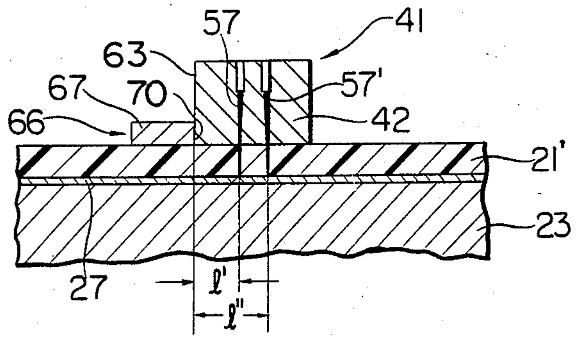
FIG. 19B is a sectional view cutaway along the line B—B of FIG. 19A and taken in the direction of the arrows.

FIG. 19A and FIG. 19B show the operation examples wherein cuts 29 and 30 are formed in the sheet flooring material 21' by using the cutter 41 as mentioned above. Reference numeral 66 denotes a ruler used when forming cuts. This ruler 66 is provided with a pair of tapped bars 68 and 69 projecting horizontally near by both ends of a bar 67. Markers 71 and 72 are attached to these tapped bars 68 and 69, said markers being designed to optionally set the distance l between the same and one side wall 70 of the bar 67 by means of a nut or the like. When making the distance l between the markers 71 and 72 and the side wall 70 of the bar 67 coincide with the distance l' or l'' between the side wall 63 of the cutter body 42 opposite to this side wall 70 and the cutting blade 57 or 57', putting the markers 71 and 72 on the standard line 24 or 25, and moving the cutter 41, with its side wall 63 along the side wall 70, on the sheet flooring material 21', the cutting blade 57 or 57' comes to automatically move on the standard line 24 or 25, and consequently the operation of forming cuts 29 and 30 can be carried out readily as well as accurately.

The invention has been described in detail sufficient to enable one of ordinary skill in the art to make and use the same. It is believed that certain modifications and alterations of the preferred embodiment will occur to others upon a reading and understanding of the specification, and it is intended to include all such alterations and modifications as part of the invention, insofar as they come within the scope of the appended claims.

What is claimed is:

1. A process of forming ornamental joints which comprises sticking a sheet flooring material onto a floor base, thereafter drawing one desirably outlined standard line on said sheet flooring material, sticking a tape like material covering the surface of the standard line drawn on the sheet flooring material, said tape like material being transparent and wider than a groove for forming a joint, forming cuts on said tape like material and the sheet flooring material by sliding a cutter with a pair of cutting blades, disposed leaving a space corresponding to the joint width therebetween, on the tape like material with one cutting blade along said standard line which can be seen through this tape like material to thereby form two parallel cuts on said flooring material, forming the groove for forming the joint by stripping the sheet flooring material between these cuts and the tape like material stuck on its surface, thereby forming a masking by said tape like material remaining on its both edge sides, and charging said groove with a joint material under the state where said masking has been provided.

2. A process of forming ornamental joints which comprises sticking a sheet flooring material onto a floor base, thereafter sticking on the sheet flooring material a tape like material which has a desired outlined standard line printed thereon and is wider than the width of a groove for forming a joint, then forming two parallel cuts on the sheet flooring material by sliding one cutting blade of a cutter, having a pair of cutting blades disposed leaving the distance corresponding to the width of the joint therebetween, along said standard line, stripping the sheet flooring material between these cuts and the tape like material stuck onto the surface of the sheet flooring material to thereby form a groove for forming a joint, forming a masking by using said tape like material remaining on its both edge sides, and charging said grooved portion with a joint material.

* * * * *